United States Patent

Rourk

[11] Patent Number: 4,465,434
[45] Date of Patent: Aug. 14, 1984

[54] COMPOSITE TURBINE WHEEL

[75] Inventor: George W. Rourk, Southfield, Mich.

[73] Assignee: Williams International Corporation, Walled Lake, Mich.

[21] Appl. No.: 372,913

[22] Filed: Apr. 29, 1982

[51] Int. Cl.³ .............................................. F01D 5/34
[52] U.S. Cl. ............................. 416/230; 416/241 A; 416/244 A
[58] Field of Search ................... 416/230, 230 A, 234, 416/241 A, 244 A

[56] References Cited

U.S. PATENT DOCUMENTS

| | | | |
|---|---|---|---|
| 3,067,982 | 11/1962 | Wheeler, Jr. | 416/230 X |
| 3,368,795 | 2/1968 | Bolin et al. | 416/241 A |
| 3,424,434 | 1/1969 | Palfreyman et al. | 416/230 |
| 3,698,262 | 10/1972 | Rabenhorst | 416/230 X |
| 4,028,962 | 6/1977 | Nelson | 416/244 A |
| 4,046,489 | 9/1977 | Fairchild et al. | 416/223 R |
| 4,175,912 | 11/1979 | Crane et al. | 416/244 A X |
| 4,191,510 | 3/1980 | Teysseyre et al. | 416/230 |
| 4,363,602 | 12/1982 | Martin | 416/230 |

FOREIGN PATENT DOCUMENTS

| | | | |
|---|---|---|---|
| 0394495 | 3/1933 | United Kingdom | 416/230 |
| 1291718 | 6/1972 | United Kingdom | 416/230 |

Primary Examiner—Harvey C. Hornsby
Assistant Examiner—Christine A. Peterson
Attorney, Agent, or Firm—Lyman R. Lyon

[57] ABSTRACT

The disclosure relates to a composite turbine wheel comprising a hub having a plurality of radially extending blades thereon. The hub and blades comprise a plurality of discrete axially spaced layers of radially extending carbon fibers and circumferentially extending carbon fibers. Hoop strength is given to the hub of the turbine wheel by the circumferentially oriented fibers and radial strength is given to the blades by the radially oriented fibers. Transmission of shear loads between the radial and circumferential fibers is minimized.

1 Claim, 3 Drawing Figures

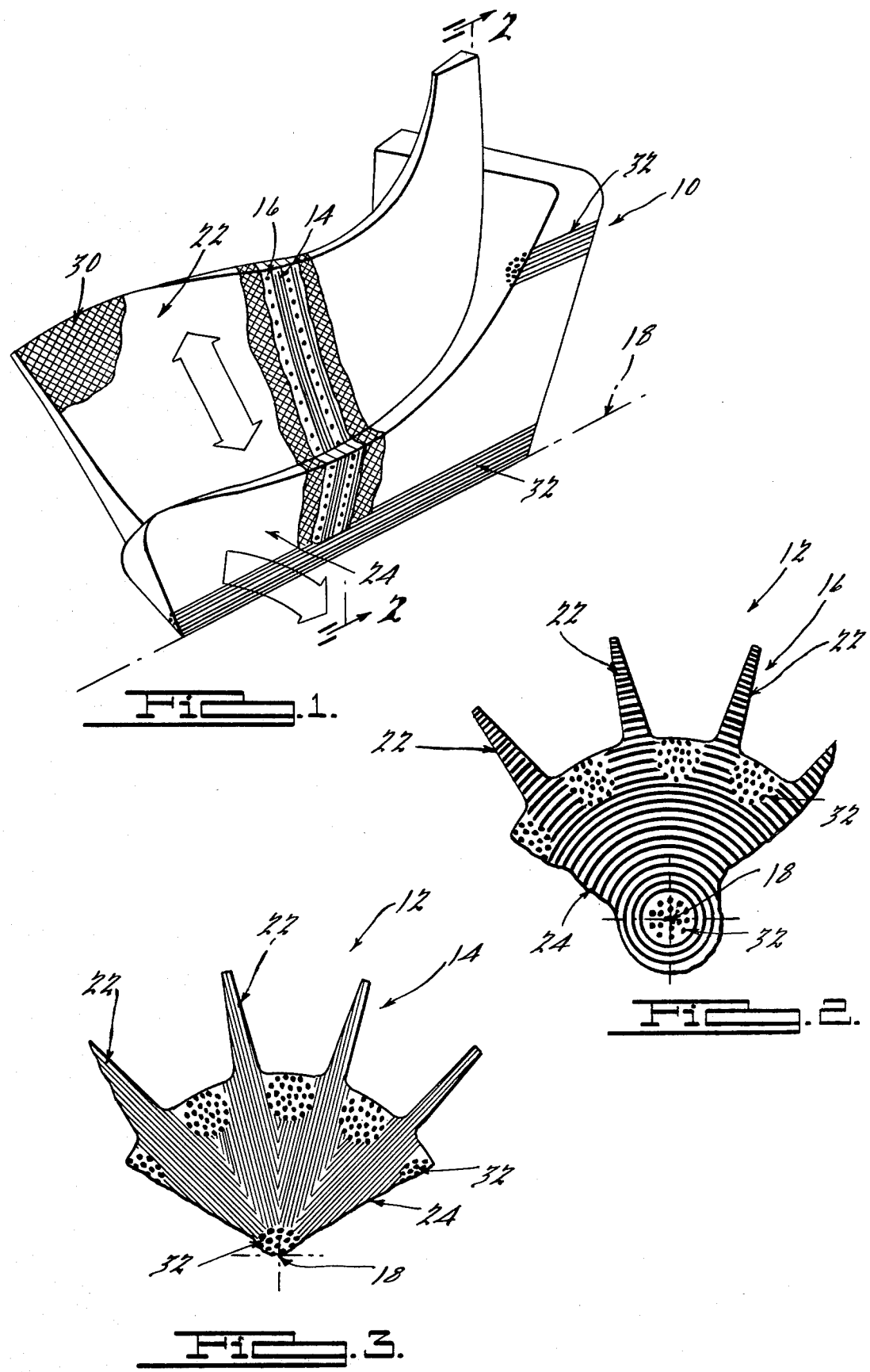

COMPOSITE TURBINE WHEEL

The U.S. Government has a paid-up license in this invention and the right in limited circumstances to require the patent owner to license others on reasonable terms as provided for by the terms of contract No. F33615-78-C-2055 awarded by the Department of the Air Force.

BACKGROUND OF THE INVENTION

It is generally desirable to maximize the combustion gas temperature of a gas turbine engine, consistent with turbine and nozzle integrity, to maximize efficiency of the engine. State of the art metal turbine wheels permit a turbine inlet temperature of approximately 2000° F. Any significant increase in this temperature requires use of alternate materials, for example, ceramics or carbon. While the maximum useful service temperature of coated carbon is approximately 6000° F., absolute strength of this material is well below requirements unless reinforced. On the other hand, filament or fiber forms of carbon, exhibit relatively high tensile strength. Thus, a solution to the low strength problem of carbon is to weave or orientate carbon fibers into a laminate.

One problem associated with the manufacture of composite turbine wheels is that of orienting the carbon fibers so that they will carry most of the centrifugal and thermal stresses generated in the bladed turbine wheel. It is desirable to have a radial orientation of the fibers in the blade area of the wheel because of the nature of the stresses. However, in the hub area, a circumferential orientation of the fibers is preferable. While it is known to manufacture the blades of compressor rotors as a composite structure utilizing fiberglass reinforced plastic, and it is known to use a combination of amorphous carbon plus carbon filaments in products such as aircraft brake discs and re-entry heat shields, it remains a problem to properly orientate the reinforcing filaments of such composite material in the turbine wheel application.

SUMMARY OF THE INVENTION

The present invention relates to a laminated, carbon fiber-reinforced carbon/carbon composite turbine rotor that is machined from a unique core structure. The core structure from which the rotor is machined consists basically of a two-ply, 0°/90° relative fiber orientation, laminate of continuous unidirectional radial and circumferential lamina stacked alternately along the turbine rotor axis. The circumferentially extending lamina is used to provide hoop integrity in the rotor hub and the radial lamina is used to transmit radial inertial load into the hub and distribute it to the circumferential lamina. In the blade itself, the circumferential lamina functions only as a filler. The radial lamina is actually made of a number of sectors of unidirectional lamina that run parallel to each blade radial centerline. As the alternating lamina are stacked to form the billet from which the rotor is machined, the radial fibers are orientated so as to be parallel to the blade radial centerline. This is accomplished by rotation of the radial lamina in relation to the axial position thereof.

The core structure lamina orientation is such that the principal lamina strength is coincident with the principal stress paths in the turbine rotor incident to high speed rotation. It is to be noted that, since the angle between lamina is essentially a 0°/90° relationship, the interlaminar stresses exhibit only a Poisson mismatch with minimum shear coupling. Stated in another manner, interlaminar shear stress associated with load transfer from radial to circumferential is minimized. A woven surface laminate is applied after the core structure is machined to provide stiffening against blade vibration and to aid in distribution of radial inertial loads in the axial direction. The woven surface laminate covers all gas path surfaces on the hub and blades and comprises two 5.0 mil thick lamina, orientated at 90° to each other and at 45° to the core lamina. The surface laminate has a volume fraction equivalent to the core laminate. For additional axial stiffness, axial bundles of carbon fibers are placed between the 12 blades of the rotor.

BRIEF DESCRIPTION OF THE DRAWINGS

FIG. 1 is a diagrammatic perspective view of a portion of a turbine wheel showing the machined blades and the orientation of the carbon fiber filaments therein;

FIG. 2 is a cross-sectional view taken through a core showing the orientation of the circumferentially orientated carbon fiber filaments; and FIG. 3 is a cross-sectional view, similar to FIG. 2, showing the orientation of the radially extending lamina.

DETAILED DESCRIPTION OF THE PREFERRED EMBODIMENT OF THE INVENTION

In accordance with the present invention, a laminated, carbon fiber-reinforced composite turbine rotor 10 is machined from a core 12 comprising a two-ply 0°/90° laminate of continuous unidirectional radial lamina 14 and circumferential lamina 16 stacked alternately along a turbine rotor axis. Axially extending carbon fibers 32 are disposed along the axis 18 of the rotor 10 and between the blades 22 thereof, shown in phantom lines in FIGS. 2 and 3. The circumferential lamina 16 is used to provide hoop integrity to a hub portion 24 of the rotor 10 and the radial lamina 14 is used to transmit radial inertial loads into the hub 24 and distribute it to the circumferential lamina 16. In the blade 22 the circumferential lamina 16 functions only as a filler.

As best seen in FIG. 3, the radial lamina 14 is actually made up of a number of sectors of unidirectional lamina that run parallel to the radial centerline of each blade 22. As the alternating lamina 14 and 16 are stacked to form the billet 12 from which the rotor 10 is machined, the radial fibers 14 are orientated by relative rotation of each radial lamina in accordance with its axial position.

Stiffening against blade vibration and distribution of radial inertial loads in the axial direction is augmented by a woven lamina 30 that is applied after the core billet 12 is machined. The woven lamina 30 covers all gas path surfaces on the hub and blades 22 and is composed of two 5.0 mil thick lamina orientated at 45° to the core lamina 14 and 16. For additional axial stiffness, axial bundles of carbon fibers 32 may be placed around the axis 18 of the rotor 10 and between the blades 22.

While the preferred embodiment of the invention has been disclosed, it should be appreciated that the invention is susceptible of modification without departing from the scope of the following claims.

I claim:

1. A carbon fiber composite turbine wheel comprising a hub having a plurality of integral radially extending blades thereon, said hub and blades comprising a plurality of discrete axially alternate lamina, one of said lamina comprising a plurality of discrete circumferentially arranged sectors, a sector being provided in said one lamina for each of said radially extending blades, each of said sectors having radially extending parallel carbon fibers, the next adjacent lamina comprising circumferentially extending carbon fibers, a first plurality of axially extending carbon fibers at the central axis of said hub and a second plurality of axially extending carbon fibers between each of said blades in radially spaced relation to said first plurality of axially extending fibers whereby hoop strength is given to said hub by said circumferentially extending fibers, radial strength is given to said blades by said radially extending fibers, and axial strength is given by said axially extending fibers.

* * * * *